(12) United States Patent
Morgan et al.

(10) Patent No.: US 10,496,661 B2
(45) Date of Patent: Dec. 3, 2019

(54) SYSTEMS AND METHODS FOR CURATING CONTENT ITEMS

(71) Applicant: Facebook, Inc., Menlo Park, CA (US)

(72) Inventors: Robert James Morgan, San Rafael, CA (US); Mark David Erickson, San Francisco, CA (US); Robert Warren Gifford, Fremont, CA (US); Satish Chander Bhatti, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 158 days.

(21) Appl. No.: 14/741,792

(22) Filed: Jun. 17, 2015

(65) Prior Publication Data

US 2016/0370973 A1 Dec. 22, 2016

(51) Int. Cl.
| | | |
|---|---|---|
| G06F 17/30 | (2006.01) | |
| G06F 16/248 | (2019.01) | |
| G06F 16/25 | (2019.01) | |
| G06F 16/2455 | (2019.01) | |
| G06F 3/0482 | (2013.01) | |

(52) U.S. Cl.
CPC .......... *G06F 16/248* (2019.01); *G06F 3/0482* (2013.01); *G06F 16/2455* (2019.01); *G06F 16/252* (2019.01)

(58) Field of Classification Search
CPC ............. G06F 17/30554; G06F 3/0482; G06F 17/30477; G06F 17/3056; G06F 16/248; G06F 16/2455; G06F 16/252
See application file for complete search history.

(56) References Cited

U.S. PATENT DOCUMENTS

| | | | | |
|---|---|---|---|---|
| 9,208,517 B1* | 12/2015 | Boggie | .............. | G06Q 30/0277 |
| 9,805,125 B2* | 10/2017 | Oztaskent | ......... | G06F 17/30867 |
| 2012/0158494 A1* | 6/2012 | Reis | .................... | G06Q 30/0241 |
| | | | | 705/14.49 |
| 2012/0197995 A1* | 8/2012 | Caruso | ................ | G06F 17/3089 |
| | | | | 709/204 |
| 2013/0035983 A1* | 2/2013 | Kursar | .............. | G06Q 30/0201 |
| | | | | 705/7.29 |
| 2013/0036363 A1* | 2/2013 | Johnson | .............. | G06F 21/6245 |
| | | | | 715/738 |
| 2013/0185143 A1* | 7/2013 | Damman | ........... | H04N 21/2541 |
| | | | | 705/14.41 |
| 2014/0025692 A1* | 1/2014 | Pappas | ................... | G06Q 30/01 |
| | | | | 707/754 |
| 2014/0136521 A1* | 5/2014 | Pappas | ................... | G06Q 50/01 |
| | | | | 707/722 |
| 2014/0255004 A1* | 9/2014 | Allen | .................... | H04H 60/377 |
| | | | | 386/241 |

(Continued)

*Primary Examiner* — Jared M Bibbee
(74) *Attorney, Agent, or Firm* — Sheppard Mullin Richter & Hampton LLP

(57) ABSTRACT

Systems, methods, and non-transitory computer-readable media can provide a graphical user interface that includes at least one set of content items that are available for curation, wherein at least one content item in the set is obtained from a social networking system, and wherein each content item is associated with at least one option for exporting the content item. A selection of the option for exporting a first content item, from the set, to a content provider can be received. The first content item can be provided to the content provider for presentation.

16 Claims, 9 Drawing Sheets

(56) References Cited

U.S. PATENT DOCUMENTS

| | | | |
|---|---|---|---|
| 2014/0280079 A1* | 9/2014 | Jain | G06F 17/3053 707/723 |
| 2014/0358911 A1* | 12/2014 | McCarthy | G06F 17/30864 707/723 |
| 2015/0195095 A1* | 7/2015 | Gillead | H04L 12/1822 726/7 |
| 2016/0188702 A1* | 6/2016 | Lee-Goldman | G06F 16/3322 707/749 |
| 2017/0093934 A1* | 3/2017 | Napper | G06Q 50/01 |

* cited by examiner

SYSTEMS AND METHODS FOR CURATING CONTENT ITEMS

FIELD OF THE INVENTION

The present technology relates to the field of content presentation. More particularly, the present technology relates to techniques facilitating the curation of content items.

BACKGROUND

Today, people often utilize computing devices (or systems) for a wide variety of purposes. Users can use their computing devices to, for example, interact with one another, create content, share information, and access information. In some instances, computing devices can be used to access various content items (e.g., posts, images, videos, etc.), for example, through a graphical user interface (GUI).

Under conventional approaches, individuals (e.g., journalists, media partners, etc.) that are responsible for curating content for a content provider (e.g., website, media provider, such as a television channel or show, etc.) can typically access content items available through various websites. When curating such content items, such individuals may need to be certain that permission to use the selected content items has been granted. For example, the use or re-publication of certain content items may raise implicate rules or standards governing such use or re-publication. Additionally, given the vast number of outlets that disseminate content, the task of locating relevant, or appropriate, content items can be time consuming. Accordingly, there exists a need for methods that simplify the process of curating content items.

SUMMARY

Various embodiments of the present disclosure can include systems, methods, and non-transitory computer readable media configured to provide a graphical user interface that includes at least one set of content items that are available for curation, wherein at least one content item in the set is obtained from a social networking system, and wherein each content item in the set is associated with at least one option for exporting the content item. A selection of the option for exporting a first content item, from the set, to a content provider can be received. The first content item can be provided to the content provider for presentation.

In an embodiment, the systems, methods, and non-transitory computer readable media configured to perform receiving a request for information about a specified entity and providing at least one content item that includes information describing a popularity of the entity.

In an embodiment, the information includes a count of a number of times the entity was mentioned in content items over a period of time.

In an embodiment, the information includes demographic information corresponding to authors of content items that mentioned the entity.

In an embodiment, the systems, methods, and non-transitory computer readable media configured to perform receiving a request for information about a specified entity and providing at least one second set of content items that includes content items that mention the entity, wherein at least one content item from the second set was posted through the social networking system.

In an embodiment, the systems, methods, and non-transitory computer readable media configured to perform receiving a request for information about a specified entity and providing at least one second set of content items that includes content items that were authored by the entity, wherein at least one content item from the second set was posted through the social networking system.

In an embodiment, the systems, methods, and non-transitory computer readable media configured to perform receiving a request for comparing at least a first entity and a second entity and providing at least one content item that includes information describing a popularity of the first entity and a popularity of the second entity.

In an embodiment, the systems, methods, and non-transitory computer readable media configured to perform receiving a request for content items associated with a specified geographic region and providing at least one content item that originated from the specified geographic region.

In an embodiment, the at least one set of content items includes one or more of: (i) content items that correspond to news events, (ii) content items that are trending at a threshold rate, or (iii) content items that correspond to trending topics.

In an embodiment, the systems, methods, and non-transitory computer readable media configured to perform modifying the first content item based at least in part on a specified theme corresponding to the content provider.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1A:
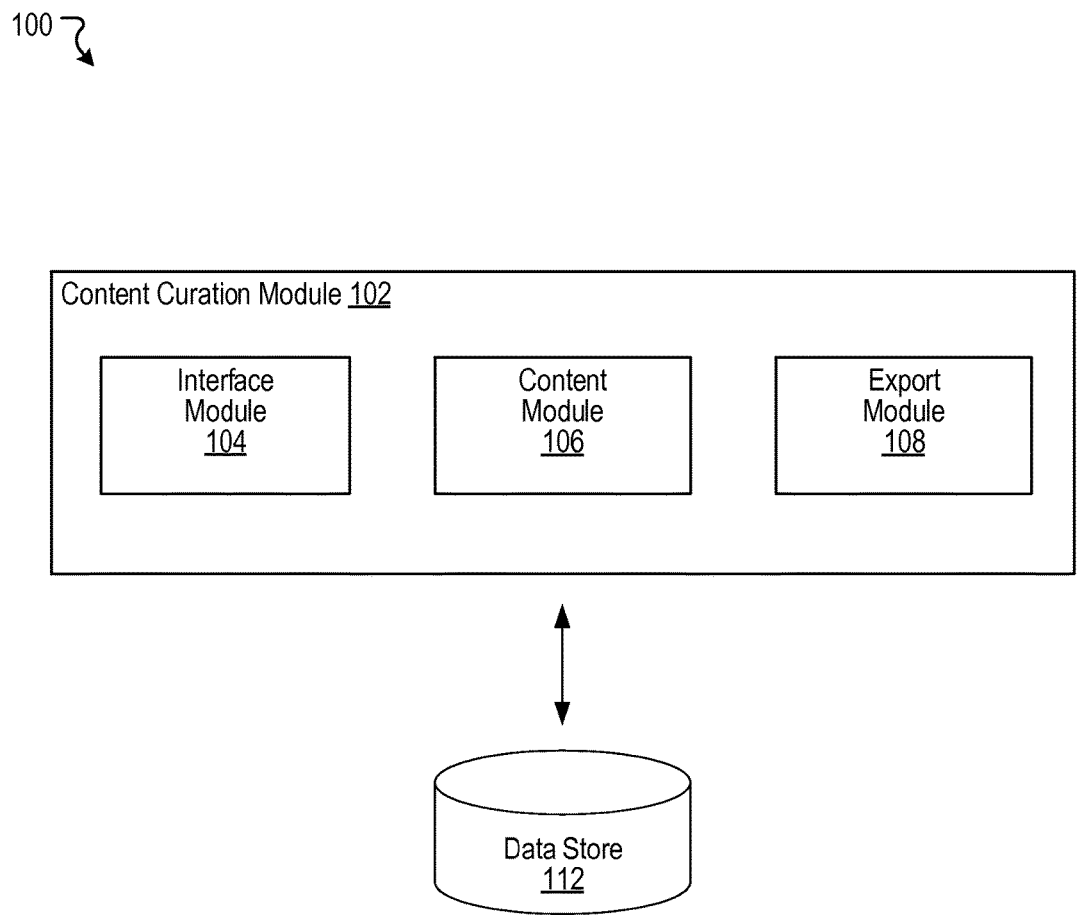
FIG. 1A illustrates an example system including an example content curation module configured to provide content items for curation, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Curating Content Items

People use computing devices (or systems) for a wide variety of purposes. As mentioned, a user can operate a computing device to access various content items (e.g., posts, images, videos, etc.), for example, through a graphical user interface (GUI). Under conventional approaches, entities that are responsible for curating content can access content items available through various websites. However, as mentioned, when curating such content items, such individuals need to be wary of restrictions that prohibit the use, or re-publishing, of certain content items. Additionally, given the vast number of outlets that disseminate content, the task of locating relevant, or appropriate, content items can be time consuming. Accordingly, there exists a need for methods that simplify the process of curating content items.

An improved approach overcomes the foregoing and other disadvantages associated with conventional approaches. In general, content items can be acquired, organized, and provided to users for purposes of content curation. For example, content items (e.g., articles, stories, posts, images, videos, etc.) can be acquired from various sources, such as third-party sources and/or social networking systems. The content items can be organized, or categorized, based at least in part on the content, or type of content, in the respective content items. Further, in various embodiments, the obtained content items are also cleared for use or re-publication on (or by) other content providers. These content items can then be presented to users (e.g., journalists, editors, media producers, etc.), for example, through one or more interfaces. One example interface is a dashboard interface that presents content items that were obtained. Other types of interfaces can be utilized, as described in this disclosure. By utilizing such an approach, curators can easily, and appropriately (e.g., legally), select content items for use, or re-publication, on other content providers or platforms.

FIG. 1A illustrates an example system 100 including an example content curation module 102 configured to provide content items for curation, according to an embodiment of the present disclosure. As shown in the example of FIG. 1A, the content curation module 102 can include an interface module 104, a content module 106, and an export module 108. In some instances, the example system 100 can include at least one data store 112. The components (e.g., modules, elements, etc.) shown in this figure and all figures herein are exemplary only, and other implementations may include additional, fewer, integrated, or different components. Some components may not be shown so as not to obscure relevant details.

In some embodiments, the content curation module 102 can be implemented, in part or in whole, as software, hardware, or any combination thereof. In general, a module, as discussed herein, can be associated with software, hardware, or any combination thereof. In some implementations, one or more functions, tasks, and/or operations of modules can be carried out or performed by software routines, software processes, hardware, and/or any combination thereof. In some cases, the content curation module 102 can be implemented, in part or in whole, as software running on one or more computing devices or systems, such as on a user computing device or client computing system. For example, the content curation module 102, or at least a portion thereof, can be implemented as or within an application (e.g., app), a program, or an applet, etc., running on a user computing device or a client computing system, such as the user device 710 of FIG. 7. Further, the content curation module 102, or at least a portion thereof, can be implemented using one or more computing devices or systems that include one or more servers, such as network servers or cloud servers. In some instances, the content curation module 102 can, in part or in whole, be implemented within or configured to operate in conjunction with a social networking system (or service), such as the social networking system 730 of FIG. 7. It should be understood that there can be many variations or other possibilities.

In various embodiments, the content curation module 102 can be configured to obtain content items, including information describing the content items, from various sources (e.g., websites or platforms, a social networking system, and other content resources). In some embodiments, the acquired content items are publically available through a social networking system, such as the social networking system 730 of FIG. 7. The content curation module 102 can associate content with corresponding entities (e.g., individuals, groups, events, topics, etc.). In one example, an entity can be associated with a content item when the content item mentions or references the entity. The number of mentions or references made of the entity in content items can be used to gauge a level of popularity of the entity. A content item can be associated with multiple entities when applicable. For example, a content item about a baseball athlete "Jane Doe" can be associated with a first entity corresponding to "Jane Doe" the baseball player and a second entity corresponding to the baseball team with which "Jane Doe" is associated. The content curation module 102 can provide interfaces through which users can access the content items. Using the interfaces, users can select content items to be included, or saved, in one or more content collections. These collections can be utilized to curate the content items. For example, a user can select a post to be presented in a television show. The selected post can be exported to a system utilized by the television show for presentation.

The interface module 104 can be configured to provide various interfaces (e.g., graphical user interfaces or GUIs) for curating content items, for example, through a software application or web browser. These interfaces can present various content items or information that users can select for curation. More details regarding the interface module 104 will be provided below in reference to FIG. 1B.

The content module 106 can receive, or obtain, content items and these content items can be made available for curation. The content items can be, for example, articles, posts (e.g., publically available posts made by entities, such as users, of a social networking system), images, or videos, to name some examples. Once obtained, these content items may be organized and included in a repository of content items (e.g., the data store 112).

The export module 108 can be configured to facilitate the exporting of selected content items. For example, the export module 108 can generate and provide, for any content item, a corresponding Uniform Resource Locator (URL) that can be used to link to the content item. In another example, the export module 108 can generate and provide, for any content item, corresponding embedding information that can be used to embed the content item, for example, in a web page. In one example, the export module 108 can provide information for the content item to be included in an "<embed>" tag. In various embodiments, the export module 108 can be configured to modify selected content items to correspond to a specified theme or motif. For example, the selected post can be modified to include a specified background, color scheme, graphics, or other forms of aesthetic modifications. The modified post can then seamlessly be provided to a content provider, for example, through an Application Programming Interface (API), to be presented by the content provider while maintaining the desired look-and-feel.

In some embodiments, the content curation module 102 can be configured to communicate and/or operate with the at least one data store 112, as shown in the example system 100. The at least one data store 112 can be configured to store and maintain various types of data. In various embodiments, the at least one data store 112 can store data relevant to function and operation of the content curation module 102. One example of such data is various content items that are available for curation. In some implementations, the at least one data store 112 can store information associated with the social networking system (e.g., the social networking system 730 of FIG. 7). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 112 can store information associated with users, such as user identifiers, user information, profile information, user specified settings, content produced or posted by users, and various other types of user data. It should be appreciated that there can be many variations or other possibilities.

Figure 1B:
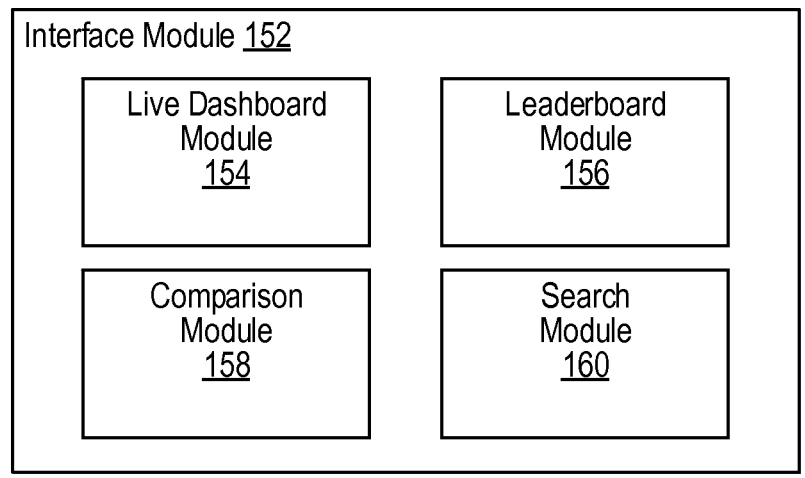
FIG. 1B illustrates an example interface module configured to provide interfaces for curating content items, according to an embodiment of the present disclosure.

FIG. 1B illustrates an example interface module 152 configured to provide content items for curation, according to an embodiment of the present disclosure. In some embodiments, the interface module 104 of FIG. 1A can be implemented with the interface module 152. As shown in the example of FIG. 1B, the interface module 152 can include a live dashboard module 154, a leaderboard module 156, a comparison module 158, and a search module 160.

The live dashboard module 154 can be configured to provide an interface that presents various content items that are available for curation. As mentioned, the content items can be obtained from a variety of sources, such as articles, stories, blog entries, user posts made through a social networking system. The content items can be presented in an interface by the live dashboard module 154 as the content items are obtained on an on-going basis. In various embodiments, the obtained content items can be organized. In one example, content items can be organized into verticals by associating the content items with applicable content categories. Such categories can include, for example, "news," "business," "entertainment," "technology," "sports," "art," "health," to name some examples. Each category may have sub-categories that can be used to provide a more granular classification of a content item. The categories and respective sub-categories may be determined, for example, based on a taxonomy for classifying content. As mentioned, content items can also be associated with entities that are mentioned or referenced in the content item.

In some embodiments, the live dashboard module 154 can present, in an interface, content items that have been determined to be relevant to recent, or trending, news events. Such content items may be identified, for example, by a third-party source and/or a social networking system. For example, a post made through a social networking system may refer to an upcoming awards ceremony. In this example, the post can be determined to be relevant to the awards ceremony based at least on its content. As a result, the post can be presented in an interface by the live dashboard module 154 with other content items that were also determined to be relevant to the awards ceremony.

In some embodiments, the live dashboard module 154 can present content items that are determined to be trending or over-performing. Such content items may be identified, for example, by a third-party source and/or a social networking system. The popularity of a content item can be measured in a number of different ways. For example, content items can be determined to be trending, or over-performing, when the content items are being accessed, or viewed, by users at a threshold rate (e.g., a count, frequency, etc.) that is greater than the rate other content items are being accessed or viewed. In some embodiments, live dashboard module 154 can filter the content items determined to be trending or over-performing to be personalized to the user accessing the interface provided by the live dashboard module 154. For example, the content items can be filtered based on a social graph of the user so that relevant content items are provided by the live dashboard module 154.

In some embodiments, the live dashboard module 154 can provide content items related to trending topics. Such content items may be identified, for example, by a third-party source and/or a social networking system. In various embodiments, the social networking system can determine topics that are trending. For example, the social networking system can evaluate content items, such as posts, that were published over some period of time to determine the topics associated with the content items. The social networking system can then determine which topics are trending, for example, based on the number of content items that are associated with a given topic. More details regarding the live dashboard module 154 will be provided below in reference to FIG. 2.

The leaderboard module 156 can be configured to provide an interface for presenting various content items that are available for curation. In some embodiments, the leaderboard module 156 can provide statistics, charts, plots, graphical models, etc., that provide a visual representation of various types of information. For example, the leaderboard module 156 can be configured to evaluate content items to determine various metrics that relate to entities. An entity can correspond to an individual such as an actor, author, influencer, journalist, sports player, for example. Entities may also correspond to groups, such as a sports team, concepts, topics, events, to name some examples. In some embodiments, an entity can be verified, for example, by a social networking system, to signify that content items authored by that entity are authentic.

In some embodiments, the leaderboard module 156 can determine how often an entity has been mentioned or referenced in content items over some period of time. Depending on the implementation, the content items evaluated for determining how often an entity is mentioned or referenced can be publically available content items, private content items (e.g., non-public communications between one or more users), or both. The leaderboard module 156 can also determine other information relating to the content items, such as respective geographic regions (e.g., continent, country, state, city, zip code, etc.) from which the content items originated. The leaderboard module 156 can also determine demographic information (e.g., age, gender, income, etc.) about the author of the content item. For example, a user of a social networking system may have posted a content item. In this example, the social networking system can determine the demographic information associated with the user for purposes of organizing and providing information relating to the content item, as described above. More details regarding the leaderboard module 156 will be provided below in reference to FIG. 3.

The comparison module 158 can be configured to provide an interface for comparing various metrics relating to entities. The comparison module 158 can also provide content items that describe or illustrate such comparisons for curation. In some embodiments, for any entity, the comparison module 158 can provide a numerical count of a number of times an entity was mentioned, or referenced, in content items over some period of time. In some embodiments, for any entity, the comparison module 158 can also determine what portion (e.g., percentage) of content items mention the entity. The portion, or percentage, may be determined by evaluating content items published over a period of time. In some embodiments, the comparison module 158 can generate and present content items that visualize such metrics relating to entities, such as statistics, charts, plots, and/or graphical models, for example. In one example, the comparison module 158 can provide a chart that illustrates the number of mentions made for selected entities over a specified period of time. More details regarding the comparison module 158 will be provided below in reference to FIG. 4.

The search module 160 can be configured to provide an interface for locating information (e.g., content items) that is responsive to a specified set of search terms. For example, for a set of search terms, the search module can provide a listing of search results that reference various topics, content items, and/or entities responsive to the search terms. In some embodiments, the search module 160 can be configured to locate content items that originate, or were published, within a specified geographic region. For example, the search module 160 can evaluate geotags associated with content items to determine respective geographic locations from which the content items originated or were published. In such embodiments, the search module 160 can locate content items that originated, or were published, at a specified geographic location or point of interest (e.g., "Times Square") or within some geographic radius (e.g., within 1 mile of "Times Square"). In other words, when searching for content items that originated or were published in a specified geographic region, the search module 160 can identify content items that were authored by entities while being located in the specified geographic region. In some embodiments, the search module 160 can be utilized to configure search queries for auto-curating content items. For example, a user can specify search criteria for locating relevant content items. Any content items that satisfy the search criteria can be automatically selected for curation. More details regarding the search module 160 will be provided below in reference to FIG. 5.

Figure 2:
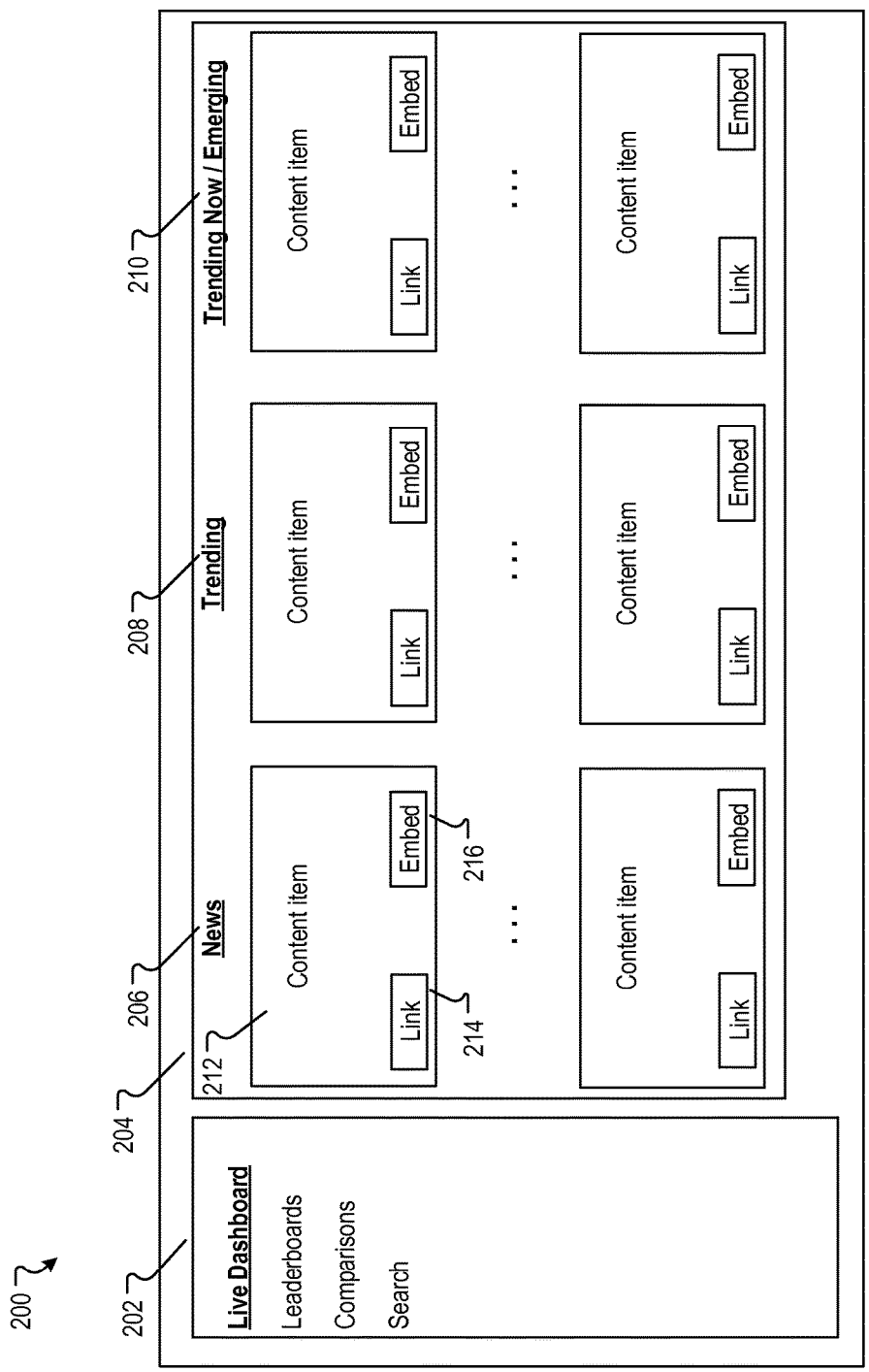
FIG. 2 illustrates an example live dashboard interface for presenting content items for curation, according to an embodiment of the present disclosure.

FIG. 2 illustrates an example dashboard interface 200 for presenting content items for curation, according to an embodiment of the present disclosure. In this example, the live dashboard interface 200 is a live dashboard that includes a first region 202 for accessing different interfaces (e.g., live dashboard, leaderboards, comparison, search) and a second region 204 for presenting content items that are available for curation.

As mentioned, the live dashboard interface 200 can present content items that have been organized into categories and/or associated with entities that were mentioned, or referenced, in the content items. In some embodiments, the live dashboard interface 200 can present a set, or collection, 206 of content items that have been determined to correspond to recent or trending news events. In some embodiments, the live dashboard interface 200 can present a set, or collection, 208 of content items that are determined to be trending or over-performing. In some embodiments, the live dashboard interface 200 can present a set, or collection, 210 of content items that are determined to correspond to trending topics. Although three sets, or collections, of content items are illustrated in FIG. 2, there may be more or fewer sets, or collections, of content items, depending on the implementation.

The live dashboard interface 200 can present each content item 212 with its corresponding media (e.g., icons, images, videos, etc.) as well as a corresponding description. Users of the live dashboard interface 200 can utilize such information when determining which content items to curate. Further, each content item can include options which, when selected, can add the content item to a curated content collection. Such collections can be used to save content items to be exported to different content provider platforms, as described above. In some embodiments, each content item 212 can include an option 214 for obtaining a link (e.g., URL) for accessing that content item, and option 216 for obtaining embedding information (e.g., JavaScript code) for embedding the content item in other content (e.g., web page), or both.

Figure 3:
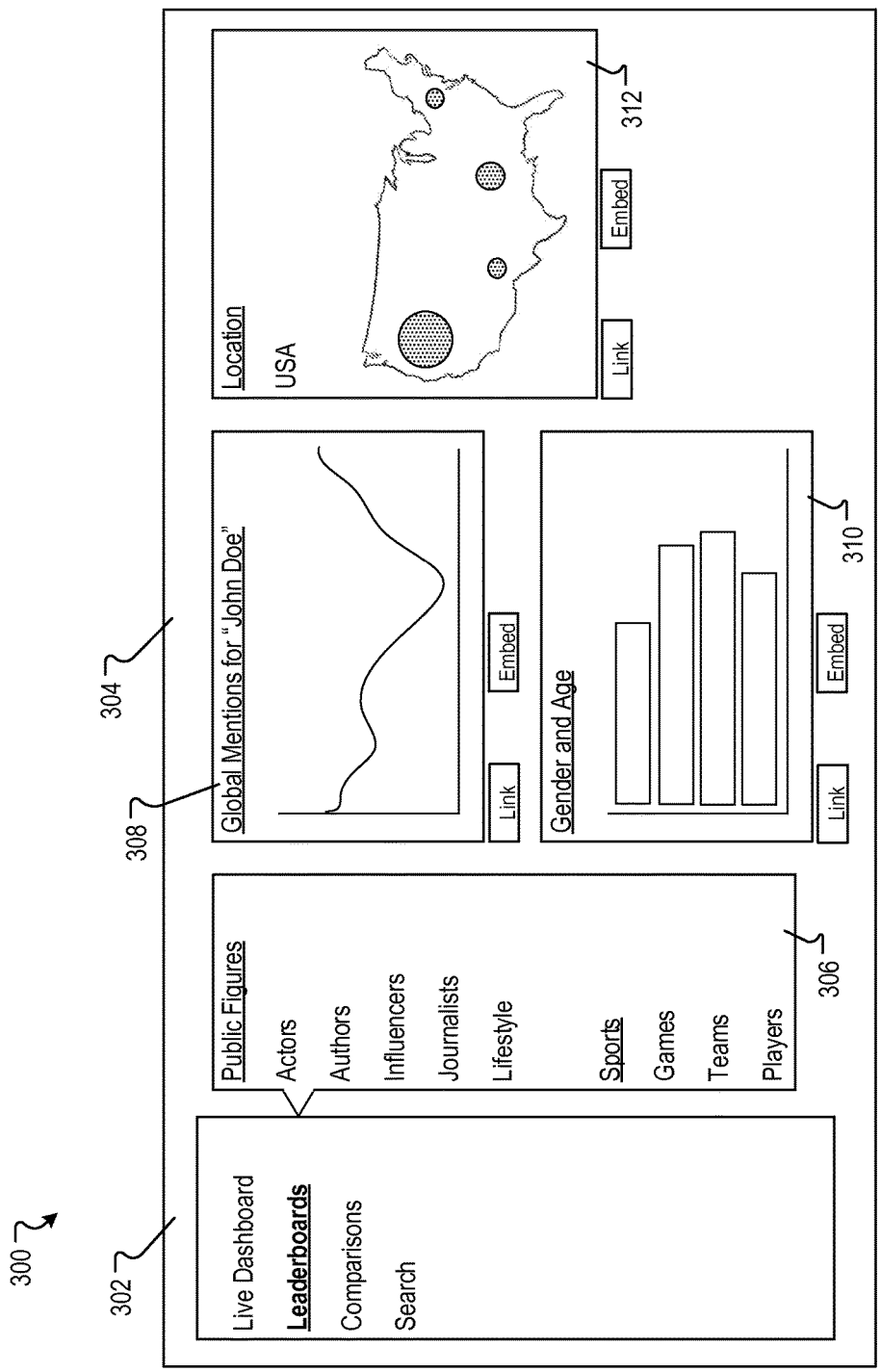
FIG. 3 illustrates an example leaderboard interface for presenting information about popular entities, according to an embodiment of the present disclosure.

FIG. 3 illustrates an example leaderboard interface 300 for presenting content items for curation, according to an embodiment of the present disclosure. In this example, the leaderboard interface 300 is a leaderboard that includes a first region 302 for accessing different interfaces and a second region 304 for presenting content items that are available for curation. In some embodiments, the content items available for curation can include statistics, charts, plots, graphical models, etc., that were determined, for example, by a social networking system. For example, the social networking system can evaluate content items, such as posts, to determine various metrics relating to entities.

A user accessing the leaderboard interface 300 can select entities 306 shown in the leaderboard interface 300 to obtain the various metrics relating to those entities. In some embodiments, the leaderboard interface 300 can provide information describing how often an entity has been mentioned, or referenced, in content items that originate from a geographic region (e.g., continent, country, state, city, zip code, etc.) over some period of time. In the example of FIG. 3, the leaderboard interface 300 provides a content item 308 that includes a graph indicating how often the entity "John Doe" has been mentioned in various content items that originated, or were posted, throughout the world. The leaderboard interface 300 also includes a content item 310 describing demographic information, such as gender and/or age, of authors of the content items that mentioned the entity "John Doe." In this example, the leaderboard interface 300 also includes a content item 312 that provides a heat map indicating geographic locations from which the various content items that mention the entity "John Doe" originated or were published. In various embodiments, any of the content items 308, 310, 312 that describe a selected entity can be exported for curation, as described above. A respective link or embedding information corresponding to a content item 308, 310, 312 may also be obtained, for example. In various embodiments, when an entity is selected, the leaderboard interface 300 can be updated to include a set, or collection, of content items that were authorized by that entity. This set, or collection, of content items can be selected for curation. The content items included in such sets, or collections, can be selected from publically available sources (e.g., public posts made through a social networking system). Further, such content items can be further filtered by the user interacting with the leaderboard interface 300 by providing search terms. In such instances, the set, or collection, of content items can be filtered, for example, to include content items that satisfy the specified search terms.

Figure 4:
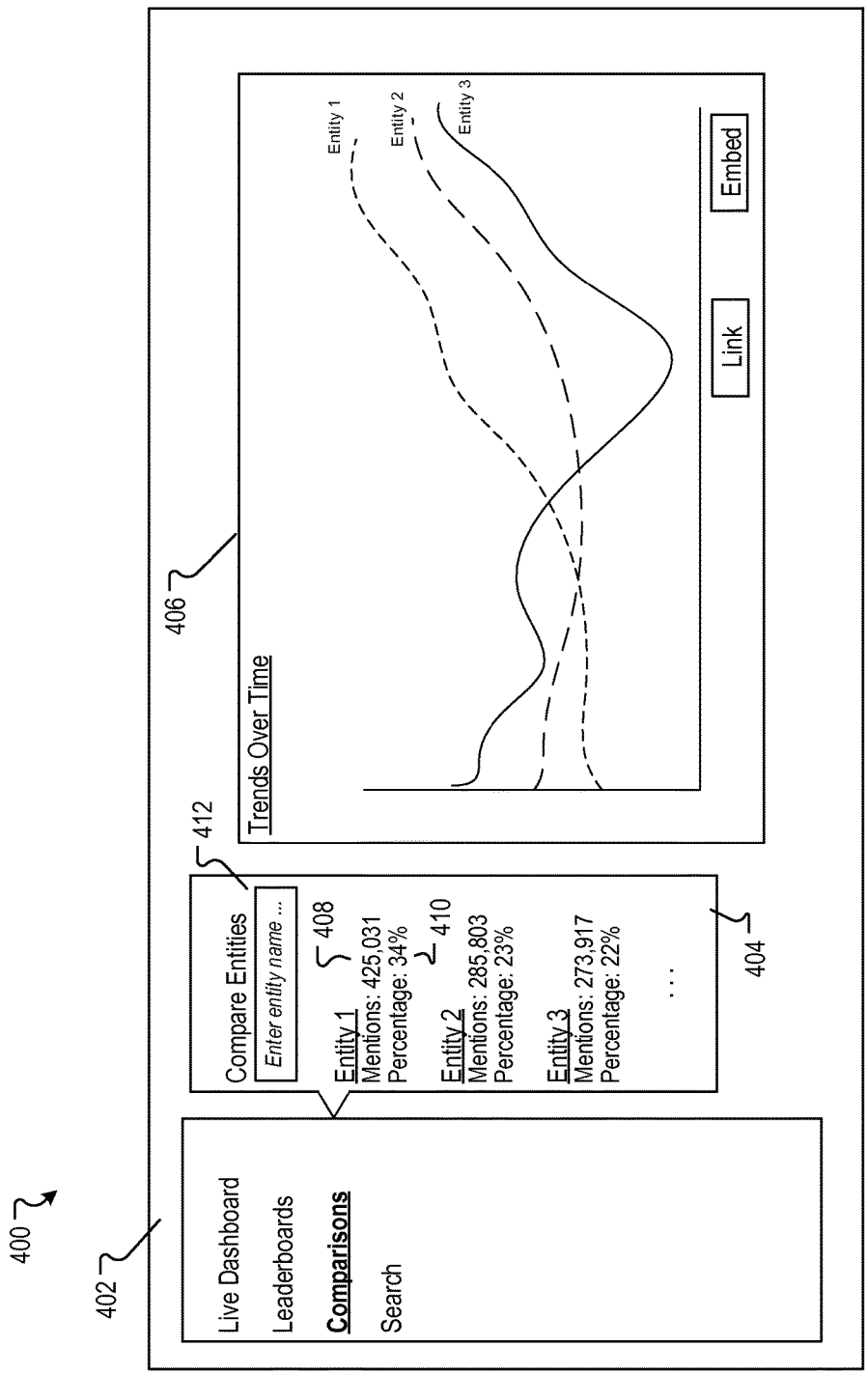
FIG. 4 illustrates an example comparison interface for comparing information about entities, according to various embodiments of the present disclosure.

FIG. 4 illustrates an example comparison interface 400 for obtaining and comparing information about entities, according to an embodiment of the present disclosure. In this example, the interface 400 includes a first region 402 for accessing different interfaces, a second region 404 for listing various information for comparing entities, and a third region 406 for providing content items (e.g., statistics, charts, plots, graphical models, etc.) that visualize such comparisons over time.

A user accessing the interface 400 can select entities provided in the listing of entities of the second region 404 to obtain various metrics for those entities. The user can also search for entities. For example, a user interacting with the interface 400 can search for entities by inputting names of the entities in a search field 412. Such entities can be included in the listing of entities of the second region 404 along with the respective information that describes the entities. In some embodiments, the interface 400 can provide a numerical count of a number of times an entity was mentioned, or referenced, in content items over some period of time. In the example of FIG. 4, a reference 408 regarding the entity "Entity 1" indicates that "Entity 1" was mentioned in 425,031 different content items. The interface 400 can also provide other statistical information, such as what portion (e.g., percentage) of content items mention, or reference, an entity. The portion, or percentage, may be determined by evaluating content items published over a period of time or from all content items published through the social networking system, for example. In the example of FIG. 4, a reference 410 regarding the entity "Entity 1" indicates that "Entity 1" was mentioned in 34 percent of content items that were published for the specified period of time.

The interface 400 can also provide content items 406 that provide a visualization of such comparisons of entities. For example, the content item 406 provides a visual graph that illustrates the number of mentions made for various selected entities (e.g., "Entity 1," "Entity 2," and "Entity 3") over a period of time. The information conveyed by the references 408, 410 describing the entities as well as corresponding content items 406 can be exported for curation, as described above. Similarly, a respective link or embedding information corresponding to the information conveyed by the references 408, 410 and/or content items 406 may also be obtained, for example.

Figure 5:
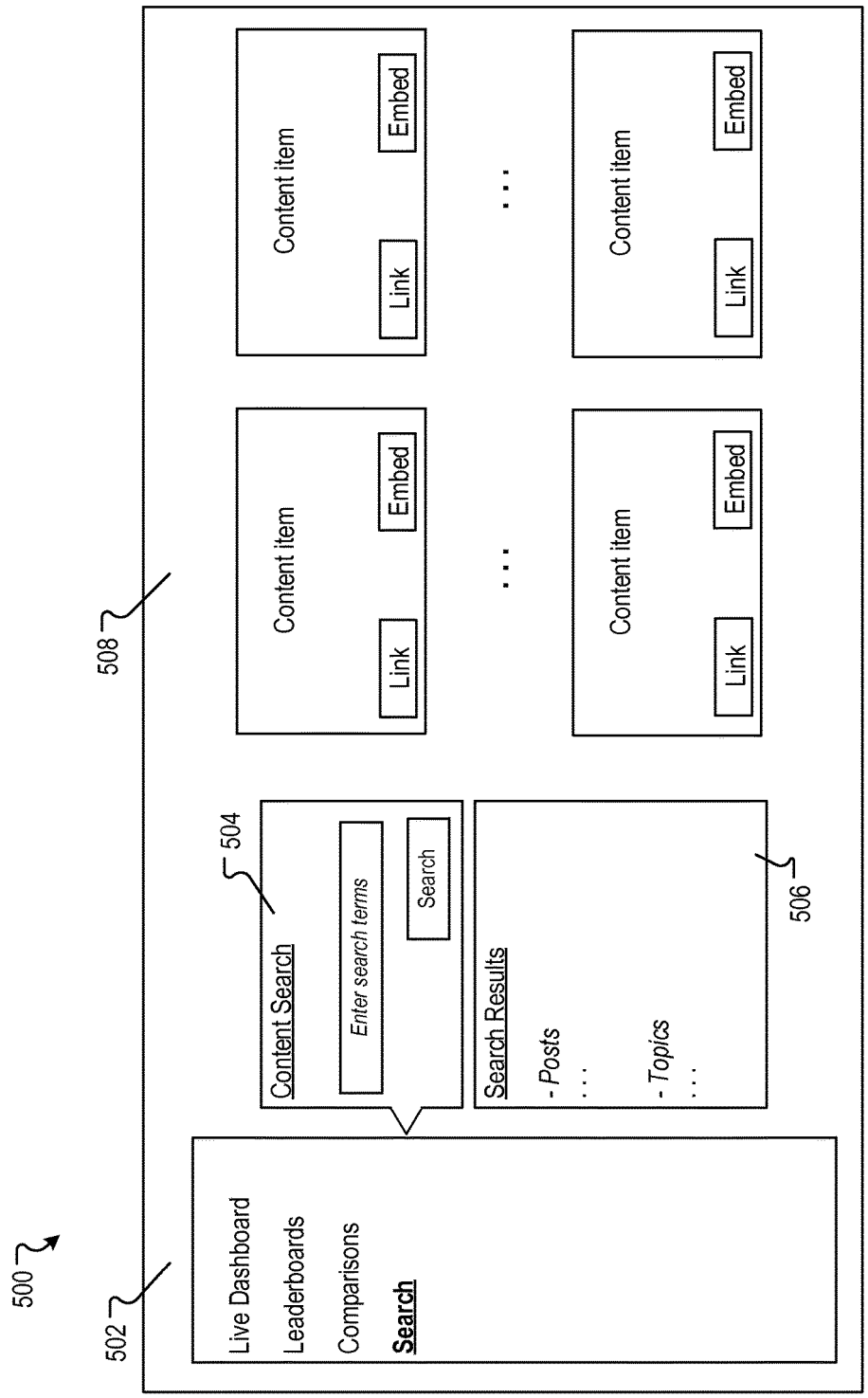
FIG. 5 illustrates an example search interface for locating content items for curation, according to an embodiment of the present disclosure.

FIG. 5 illustrates an example search interface 500 for locating content items for curation, according to an embodiment of the present disclosure. In this example, the interface 500 is a search interface that includes a first region 502 for accessing different interfaces and a second region 508 for presenting content items that are in response to a search query and that are available for curation.

A user accessing the interface 500 can input search terms in a search field 504 to obtain content items that are responsive to the search terms. For example, the user can search for various entities. Search results that are responsive to the search terms can be presented in a region 506 of the interface 500. The search results can include, for example, any entities that were determined to be responsive to the search terms. For example, a search query for the term "tigers" can provide, for example, a listing of entities "Tigers (movie)," "Tiger Sushi," and "Tiger Records." The user can select an entity from the region 506 to obtain content items that are responsive or related to that entity. In some embodiments, content items that are responsive or related to the search terms can be presented in the region 508 of the interface 500. For example, upon selecting "Tiger Records," the region 508 can be populated with content items that are responsive or related to the entity "Tiger Records." The user can select content items from the region 508 to be exported for curation, as described above. Similarly, a respective link or embedding information corresponding to each content item may also be obtained, for example.

Figure 6:
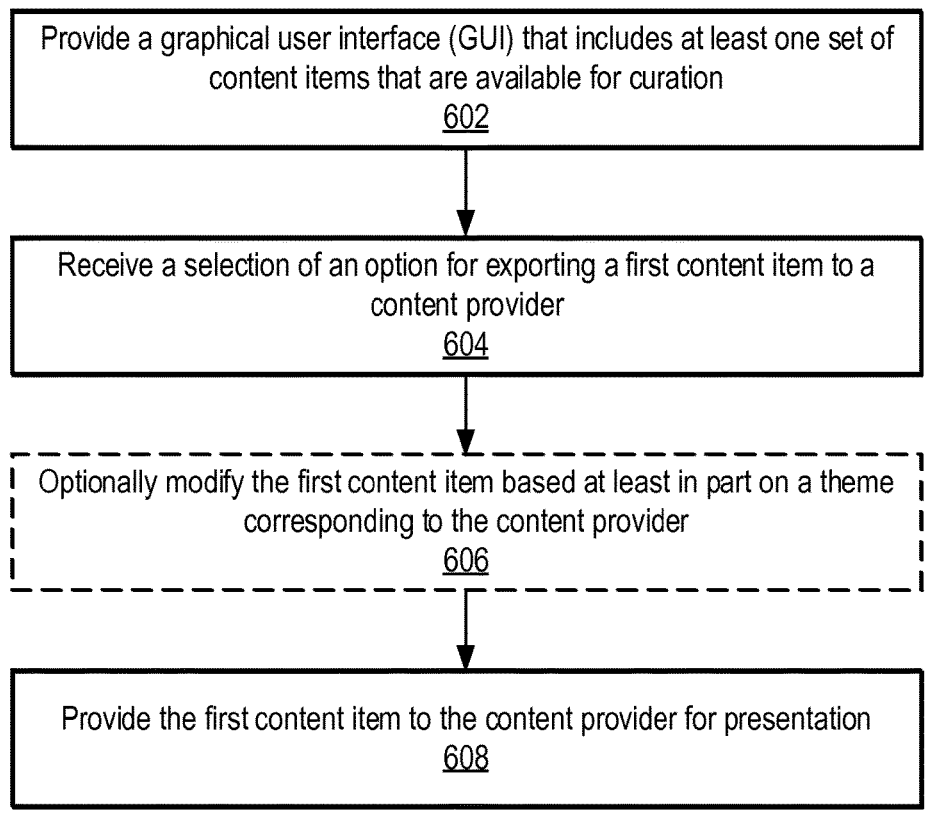
FIG. 6 illustrates an example method for curating content items, according to an embodiment of the present disclosure.

FIG. 6 illustrates an example method 600 for curating content items, according to an embodiment of the present disclosure. It should be appreciated that there can be additional, fewer, or alternative steps performed in similar or alternative orders, or in parallel, within the scope of the various embodiments discussed herein unless otherwise stated.

At block 602, the example method 600 can provide, to a computing device, a graphical user interface that includes at least one set of content items that are available for curation. At least one content item in the set can be obtained from a social networking system. Further, each content item in the set can be associated with at least one option for exporting the content item. At block 604, the method 600 can receive, from the computing device, a selection of an option for exporting a first content item to a content provider. At block 606, the method 600 can optionally modify the first content item based at least in part on a theme corresponding to the content provider. At block 608, the method 600 can provide the first content item to the content provider for presentation.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 7:
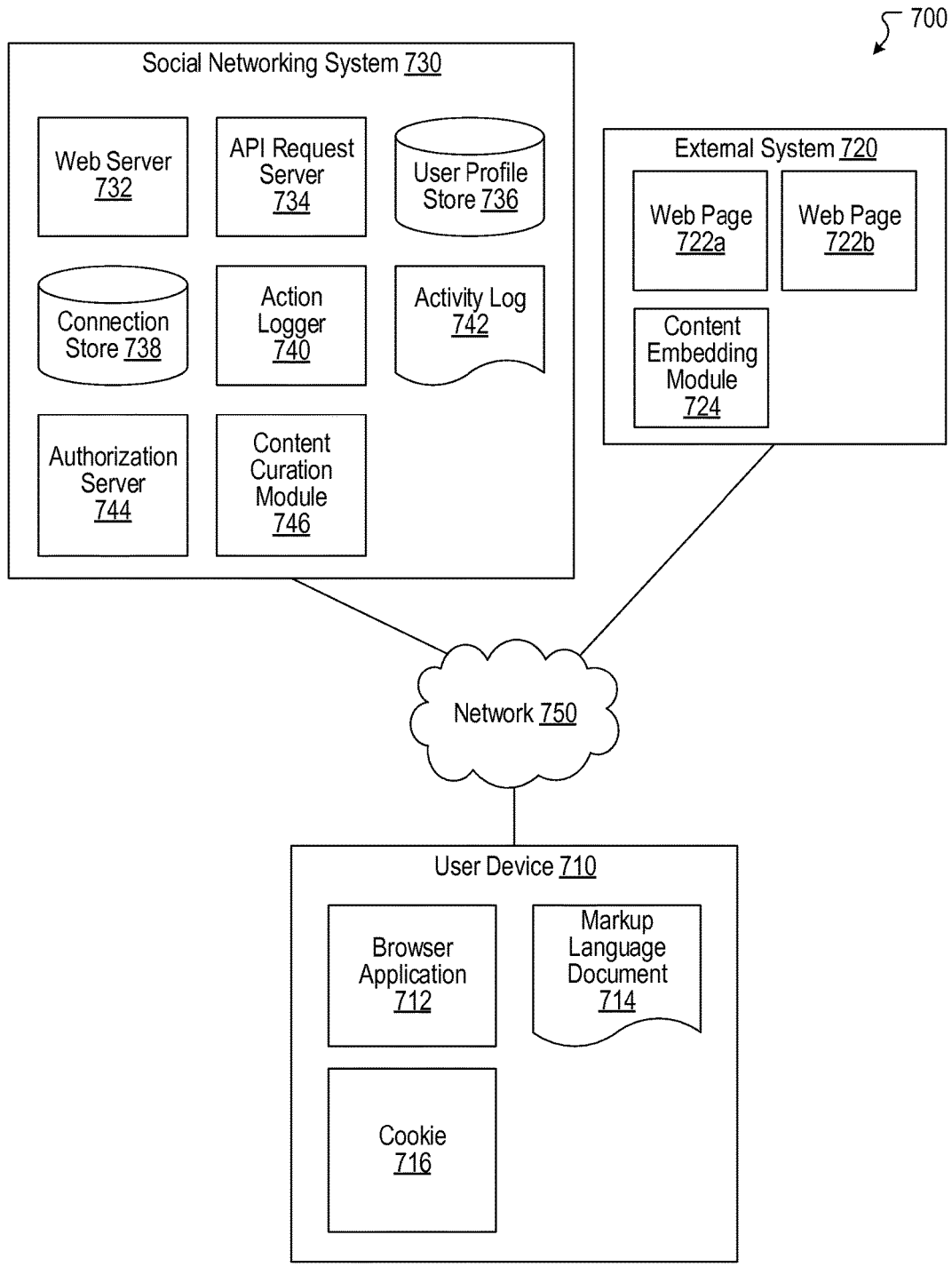
FIG. 7 illustrates a network diagram of an example system including an example social networking system that can be utilized in various scenarios, according to an embodiment of the present disclosure.

FIG. 7 illustrates a network diagram of an example system 700 that can be utilized in various scenarios, in accordance with an embodiment of the present disclosure. The system 700 includes one or more user devices 710, one or more external systems 720, a social networking system (or service) 730, and a network 750. In an embodiment, the social networking service, provider, and/or system discussed in connection with the embodiments described above may be implemented as the social networking system 730. For purposes of illustration, the embodiment of the system 700, shown by FIG. 7, includes a single external system 720 and a single user device 710. However, in other embodiments, the system 700 may include more user devices 710 and/or more external systems 720. In certain embodiments, the social networking system 730 is operated by a social network provider, whereas the external systems 720 are separate from the social networking system 730 in that they may be operated by different entities. In various embodiments, however, the social networking system 730 and the external systems 720 operate in conjunction to provide social networking services to users (or members) of the social networking system 730. In this sense, the social networking system 730 provides a platform or backbone, which other systems, such as external systems 720, may use to provide social networking services and functionalities to users across the Internet.

The user device 710 comprises one or more computing devices (or systems) that can receive input from a user and transmit and receive data via the network 750. In one embodiment, the user device 710 is a conventional computer system executing, for example, a Microsoft Windows compatible operating system (OS), Apple OS X, and/or a Linux distribution. In another embodiment, the user device 710 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 710 is configured to communicate via the network 750. The user device 710 can execute an application, for example, a browser application that allows a user of the user device 710 to interact with the social networking system 730. In another embodiment, the user device 710 interacts with the social networking system 730 through an application programming interface (API) provided by the native operating system of the user device 710, such as iOS and ANDROID. The user device 710 is configured to communicate with the external system 720 and the social networking system 730 via the network 750, which may comprise any combination of local area and/or wide area networks, using wired and/or wireless communication systems.

In one embodiment, the network 750 uses standard communications technologies and protocols. Thus, the network 750 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 750 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 750 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 710 may display content from the external system 720 and/or from the social networking system 730 by processing a markup language document 714 received from the external system 720 and from the social networking system 730 using a browser application 712. The markup language document 714 identifies content and one or more instructions describing formatting or presentation of the content. By executing the instructions included in the markup language document 714, the browser application 712 displays the identified content using the format or presentation described by the markup language document 714. For example, the markup language document 714 includes instructions for generating and displaying a web page having multiple frames that include text and/or image data retrieved from the external system 720 and the social networking system 730. In various embodiments, the markup language document 714 comprises a data file including extensible markup language (XML) data, extensible hypertext markup language (XHTML) data, or other markup language data. Additionally, the markup language document 714 may include JavaScript Object Notation (JSON) data, JSON with padding (JSONP), and JavaScript data to facilitate data-interchange between the external system 720 and the user device 710. The browser application 712 on the user device 710 may use a JavaScript compiler to decode the markup language document 714.

The markup language document 714 may also include, or link to, applications or application frameworks such as FLASH™ or Unity™ applications, the Silverlight™ application framework, etc.

In one embodiment, the user device 710 also includes one or more cookies 716 including data indicating whether a user of the user device 710 is logged into the social networking system 730, which may enable modification of the data communicated from the social networking system 730 to the user device 710.

The external system 720 includes one or more web servers that include one or more web pages 722a, 722b, which are communicated to the user device 710 using the network 750. The external system 720 is separate from the social networking system 730. For example, the external system 720 is associated with a first domain, while the social networking system 730 is associated with a separate social networking domain. Web pages 722a, 722b, included in the external system 720, comprise markup language documents 714 identifying content and including instructions specifying formatting or presentation of the identified content. As discussed previously, it should be appreciated that there can be many variations or other possibilities.

The social networking system 730 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 730 may be administered, managed, or controlled by an operator. The operator of the social networking system 730 may be a human being, an automated application, or a series of applications for managing content, regulating policies, and collecting usage metrics within the social networking system 730. Any type of operator may be used.

Users may join the social networking system 730 and then add connections to any number of other users of the social networking system 730 to whom they desire to be connected. As used herein, the term "friend" refers to any other user of the social networking system 730 to whom a user has formed a connection, association, or relationship via the social networking system 730. For example, in an embodiment, if users in the social networking system 730 are represented as nodes in the social graph, the term "friend" can refer to an edge formed between and directly connecting two user nodes.

Connections may be added explicitly by a user or may be automatically created by the social networking system 730 based on common characteristics of the users (e.g., users who are alumni of the same educational institution). For example, a first user specifically selects a particular other user to be a friend. Connections in the social networking system 730 are usually in both directions, but need not be, so the terms "user" and "friend" depend on the frame of reference. Connections between users of the social networking system 730 are usually bilateral ("two-way"), or "mutual," but connections may also be unilateral, or "one-way." For example, if Bob and Joe are both users of the social networking system 730 and connected to each other, Bob and Joe are each other's connections. If, on the other hand, Bob wishes to connect to Joe to view data communicated to the social networking system 730 by Joe, but Joe does not wish to form a mutual connection, a unilateral connection may be established. The connection between users may be a direct connection; however, some embodiments of the social networking system 730 allow the connection to be indirect via one or more levels of connections or degrees of separation.

In addition to establishing and maintaining connections between users and allowing interactions between users, the social networking system 730 provides users with the ability to take actions on various types of items supported by the social networking system 730. These items may include groups or networks (i.e., social networks of people, entities, and concepts) to which users of the social networking system 730 may belong, events or calendar entries in which a user might be interested, computer-based applications that a user may use via the social networking system 730, transactions that allow users to buy or sell items via services provided by or through the social networking system 730, and interactions with advertisements that a user may perform on or off the social networking system 730. These are just a few examples of the items upon which a user may act on the social networking system 730, and many others are possible. A user may interact with anything that is capable of being represented in the social networking system 730 or in the external system 720, separate from the social networking system 730, or coupled to the social networking system 730 via the network 750.

The social networking system 730 is also capable of linking a variety of entities. For example, the social networking system 730 enables users to interact with each other as well as external systems 720 or other entities through an API, a web service, or other communication channels. The social networking system 730 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 730. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 730 modifies edges connecting the various nodes to reflect the relationships and interactions.

The social networking system 730 also includes user-generated content, which enhances a user's interactions with the social networking system 730. User-generated content may include anything a user can add, upload, send, or "post" to the social networking system 730. For example, a user communicates posts to the social networking system 730 from a user device 710. Posts may include data such as status updates or other textual data, location information, images such as photos, videos, links, music or other similar data and/or media. Content may also be added to the social networking system 730 by a third party. Content "items" are represented as objects in the social networking system 730. In this way, users of the social networking system 730 are encouraged to communicate with each other by posting text and content items of various types of media through various communication channels. Such communication increases the interaction of users with each other and increases the frequency with which users interact with the social networking system 730.

The social networking system 730 includes a web server 732, an API request server 734, a user profile store 736, a connection store 738, an action logger 740, an activity log 742, and an authorization server 744. In an embodiment of the invention, the social networking system 730 may include additional, fewer, or different components for various applications. Other components, such as network interfaces, security mechanisms, load balancers, failover servers, management and network operations consoles, and the like are not shown so as to not obscure the details of the system.

The user profile store 736 maintains information about user accounts, including biographic, demographic, and other types of descriptive information, such as work experience, educational history, hobbies or preferences, location, and the like that has been declared by users or inferred by the social networking system 730. This information is stored in the user profile store 736 such that each user is uniquely identified. The social networking system 730 also stores data describing one or more connections between different users in the connection store 738. The connection information may indicate users who have similar or common work experience, group memberships, hobbies, or educational history. Additionally, the social networking system 730 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 730, such as non-person entities, buckets, cluster centers, images, interests, pages, external systems, concepts, and the like are also stored in the connection store 738.

The social networking system 730 maintains data about objects with which a user may interact. To maintain this data, the user profile store 736 and the connection store 738 store instances of the corresponding type of objects maintained by the social networking system 730. Each object type has information fields that are suitable for storing information appropriate to the type of object. For example, the user profile store 736 contains data structures with fields suitable for describing a user's account and information related to a user's account. When a new object of a particular type is created, the social networking system 730 initializes a new data structure of the corresponding type, assigns a unique object identifier to it, and begins to add data to the object as needed. This might occur, for example, when a user becomes a user of the social networking system 730, the social networking system 730 generates a new instance of a user profile in the user profile store 736, assigns a unique identifier to the user account, and begins to populate the fields of the user account with information provided by the user.

The connection store 738 includes data structures suitable for describing a user's connections to other users, connections to external systems 720 or connections to other entities. The connection store 738 may also associate a connection type with a user's connections, which may be used in conjunction with the user's privacy setting to regulate access to information about the user. In an embodiment of the invention, the user profile store 736 and the connection store 738 may be implemented as a federated database.

Data stored in the connection store 738, the user profile store 736, and the activity log 742 enables the social networking system 730 to generate the social graph that uses nodes to identify various objects and edges connecting nodes to identify relationships between different objects. For example, if a first user establishes a connection with a second user in the social networking system 730, user accounts of the first user and the second user from the user profile store 736 may act as nodes in the social graph. The connection between the first user and the second user stored by the connection store 738 is an edge between the nodes associated with the first user and the second user. Continuing this example, the second user may then send the first user a message within the social networking system 730. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 730 (or, alternatively, in an image maintained by another system outside of the social networking system 730). The image may itself be represented as a node in the social networking system 730. This tagging action may create edges between the first user and the second user as well as create an edge between each of the users and the image, which is also a node in the social graph. In yet another example, if a user confirms attending an event, the user and the event are nodes obtained from the user profile store 736, where the attendance of the event is an edge between the nodes that may be retrieved from the activity log 742. By generating and maintaining the social graph, the social networking system 730 includes data describing many different types of objects and the interactions and connections among those objects, providing a rich source of socially relevant information.

The web server 732 links the social networking system 730 to one or more user devices 710 and/or one or more external systems 720 via the network 750. The web server 732 serves web pages, as well as other web-related content, such as Java, JavaScript, Flash, XML, and so forth. The web server 732 may include a mail server or other messaging functionality for receiving and routing messages between the social networking system 730 and one or more user devices 710. The messages can be instant messages, queued messages (e.g., email), text and SMS messages, or any other suitable messaging format.

The API request server 734 allows one or more external systems 720 and user devices 710 to call access information from the social networking system 730 by calling one or more API functions. The API request server 734 may also allow external systems 720 to send information to the social networking system 730 by calling APIs. The external system 720, in one embodiment, sends an API request to the social networking system 730 via the network 750, and the API request server 734 receives the API request. The API request server 734 processes the request by calling an API associated with the API request to generate an appropriate response, which the API request server 734 communicates to the external system 720 via the network 750. For example, responsive to an API request, the API request server 734 collects data associated with a user, such as the user's connections that have logged into the external system 720, and communicates the collected data to the external system 720. In another embodiment, the user device 710 communicates with the social networking system 730 via APIs in the same manner as external systems 720.

The action logger 740 is capable of receiving communications from the web server 732 about user actions on and/or off the social networking system 730. The action logger 740 populates the activity log 742 with information about user actions, enabling the social networking system 730 to discover various actions taken by its users within the social networking system 730 and outside of the social networking system 730. Any action that a particular user takes with respect to another node on the social networking system 730 may be associated with each user's account, through information maintained in the activity log 742 or in a similar database or other data repository. Examples of actions taken by a user within the social networking system 730 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 730, the action is recorded in the activity log 742. In one embodiment, the social networking system 730 maintains the activity log 742 as a database of entries. When an action is taken within the social networking system 730, an entry for the action is added to the activity log 742. The activity log 742 may be referred to as an action log.

Additionally, user actions may be associated with concepts and actions that occur within an entity outside of the social networking system 730, such as an external system 720 that is separate from the social networking system 730. For example, the action logger 740 may receive data describing a user's interaction with an external system 720 from the web server 732. In this example, the external system 720 reports a user's interaction according to structured actions and objects in the social graph.

Other examples of actions where a user interacts with an external system 720 include a user expressing an interest in an external system 720 or another entity, a user posting a comment to the social networking system 730 that discusses an external system 720 or a web page 722a within the external system 720, a user posting to the social networking system 730 a Uniform Resource Locator (URL) or other identifier associated with an external system 720, a user attending an event associated with an external system 720, or any other action by a user that is related to an external system 720. Thus, the activity log 742 may include actions describing interactions between a user of the social networking system 730 and an external system 720 that is separate from the social networking system 730.

The authorization server 744 enforces one or more privacy settings of the users of the social networking system 730. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 720, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 720. One embodiment allows the specification of the set of entities to comprise an enumeration of entities. For example, the user may provide a list of external systems 720 that are allowed to access certain information. Another embodiment allows the specification to comprise a set of entities along with exceptions that are not allowed to access the information. For example, a user may allow all external systems 720 to access the user's work information, but specify a list of external systems 720 that are not allowed to access the work information. Certain embodiments call the list of exceptions that are not allowed to access certain information a "block list". External systems 720 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 744 contains logic to determine if certain information associated with a user can be accessed by a user's friends, external systems 720, and/or other applications and entities. The external system 720 may need authorization from the authorization server 744 to access the user's more private and sensitive information, such as the user's work phone number. Based on the user's privacy settings, the authorization server 744 determines if another user, the external system 720, an application, or another entity is allowed to access information associated with the user, including information about actions taken by the user.

In some embodiments, the social networking system 730 can include a content curation module 746. The content curation module 746 can, for example, be implemented as the content curation module 102 of FIG. 1A. As discussed previously, it should be appreciated that there can be many variations or other possibilities.

Hardware Implementation

Figure 8:
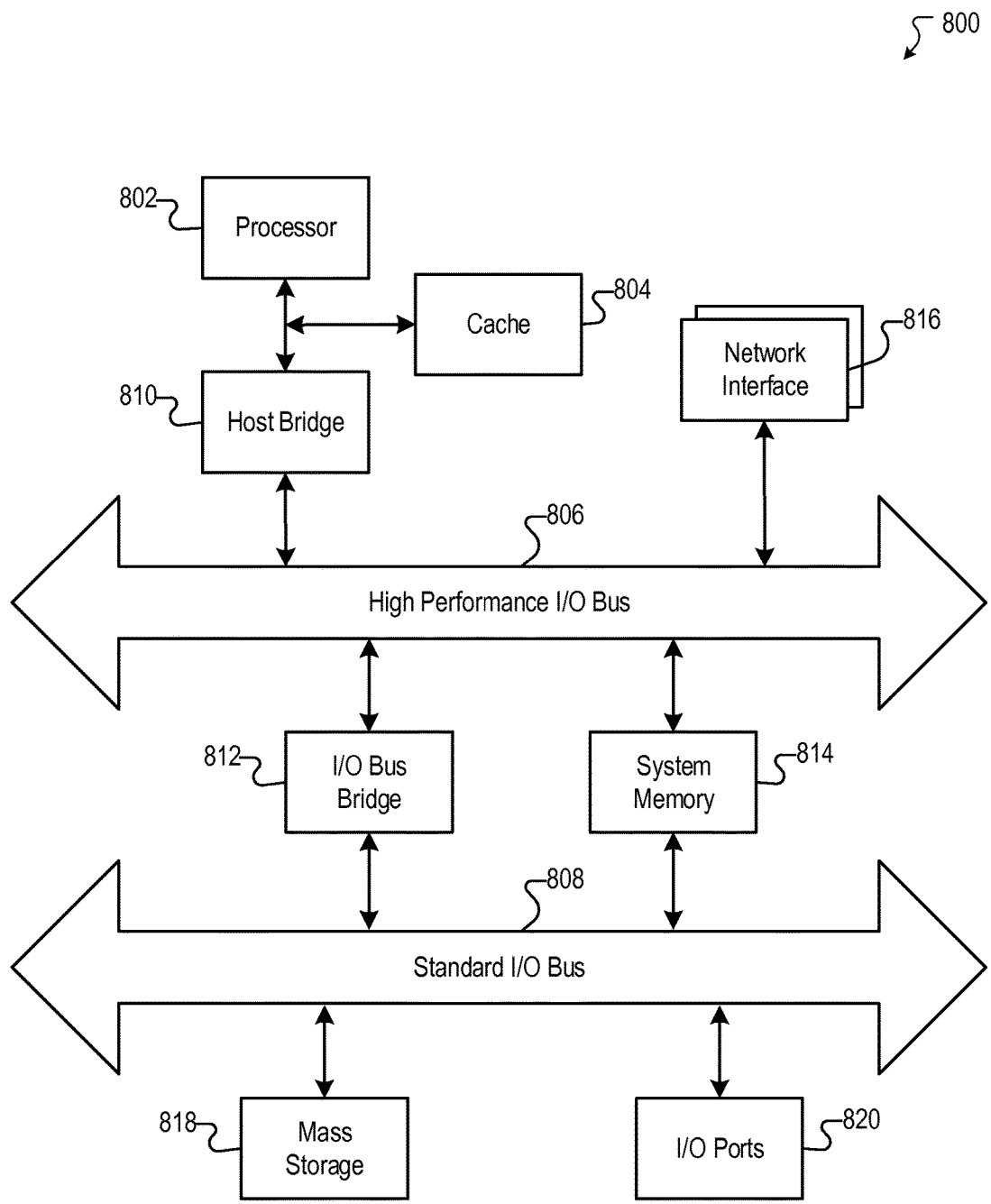
FIG. 8 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 8 illustrates an example of a computer system 800 that may be used to implement one or more of the embodiments described herein in accordance with an embodiment of the invention. The computer system 800 includes sets of instructions for causing the computer system 800 to perform the processes and features discussed herein. The computer system 800 may be connected (e.g., networked) to other machines. In a networked deployment, the computer system 800 may operate in the capacity of a server machine or a client machine in a client-server network environment, or as a peer machine in a peer-to-peer (or distributed) network environment. In an embodiment of the invention, the computer system 800 may be the social networking system 730, the user device 710, and the external system 820, or a component thereof. In an embodiment of the invention, the computer system 800 may be one server among many that constitutes all or part of the social networking system 730.

The computer system 800 includes a processor 802, a cache 804, and one or more executable modules and drivers, stored on a computer-readable medium, directed to the processes and features described herein. Additionally, the computer system 800 includes a high performance input/output (I/O) bus 806 and a standard I/O bus 808. A host bridge 810 couples processor 802 to high performance I/O bus 806, whereas I/O bus bridge 812 couples the two buses 806 and 808 to each other. A system memory 814 and one or more network interfaces 816 couple to high performance I/O bus 806. The computer system 800 may further include video memory and a display device coupled to the video memory (not shown). Mass storage 818 and I/O ports 820 couple to the standard I/O bus 808. The computer system 800 may optionally include a keyboard and pointing device, a display device, or other input/output devices (not shown) coupled to the standard I/O bus 808. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 800, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 800 are described in greater detail below. In particular, the network interface 816 provides communication between the computer system 800 and any of a wide range of networks, such as an Ethernet (e.g., IEEE 802.3) network, a backplane, etc. The mass storage 818 provides permanent storage for the data and programming instructions to perform the above-described processes and features implemented by the respective computing systems identified above, whereas the system memory 814 (e.g., DRAM) provides temporary storage for the data and programming instructions when executed by the processor 802. The I/O ports 820 may be one or more serial and/or parallel communication ports that provide communication between additional peripheral devices, which may be coupled to the computer system 800.

The computer system 800 may include a variety of system architectures, and various components of the computer system 800 may be rearranged. For example, the cache 804 may be on-chip with processor 802. Alternatively, the cache 804 and the processor 802 may be packed together as a "processor module", with processor 802 being referred to as the "processor core". Furthermore, certain embodiments of the invention may neither require nor include all of the above components. For example, peripheral devices coupled to the standard I/O bus 808 may couple to the high performance I/O bus 806. In addition, in some embodiments, only a single bus may exist, with the components of the computer system 800 being coupled to the single bus. Moreover, the computer system 800 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 800 that, when read and executed by one or more processors, cause the computer system 800 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 800, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 802. Initially, the series of instructions may be stored on a storage device, such as the mass storage 818. However, the series of instructions can be stored on any suitable computer readable storage medium. Furthermore, the series of instructions need not be stored locally, and could be received from a remote storage device, such as a server on a network, via the network interface 816. The instructions are copied from the storage device, such as the mass storage 818, into the system memory 814 and then accessed and executed by the processor 802. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 800 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
providing, by a computing system, a graphical user interface that includes a first region and a second region, wherein the first region in the interface provides access to at least one set of content items that are available for curation, wherein at least one content item in the set is obtained from a social networking system, wherein each content item in the set is associated with at least one option for exporting the content item, wherein the second region in the interface provides information for entities that are referenced in the at least one set of content items that are available for curation, and wherein the information at least describes a respective count of a number of times an entity was mentioned over a period of time by a plurality of authors each associated with demographics, wherein the demographics include at least one of age, gender, or geographic region and the respective count is segmented based on the demographics;

determining, by the computing system, at least one first content item from the set that satisfies criteria for auto-curating content items, wherein the criteria for auto-curating content items includes search criteria for locating relevant content items; and exporting, by the computing system, the first content item to a content provider for presentation, wherein the first content item is modified based at least in part on a specified theme corresponding to the content provider.

2. The computer-implemented method of claim 1, the method further comprising:

receiving, by the computing system, a request for information about a specified entity; and providing, by the computing system, at least one content item that includes information describing a popularity of the entity.

3. The computer-implemented method of claim 2, wherein the information includes demographic information corresponding to authors of content items that mentioned the entity.

4. The computer-implemented method of claim 1, the method further comprising:

receiving, by the computing system, a request for information about a specified entity; and providing, by the computing system, at least one second set of content items that includes content items that mention the entity, wherein at least one content item from the second set was posted through the social networking system.

5. The computer-implemented method of claim 1, the method further comprising:

receiving, by the computing system, a request for information about a specified entity; and providing, by the computing system, at least one second set of content items that includes content items that were authored by the entity, wherein at least one content item from the second set was posted through the social networking system.

6. The computer-implemented method of claim 1, the method further comprising:

receiving, by the computing system, a request for comparing at least a first entity and a second entity; and providing, by the computing system, at least one content item that includes information describing a popularity of the first entity and a popularity of the second entity.

7. The computer-implemented method of claim 1, the method further comprising:

receiving, by the computing system, a request for content items associated with a specified geographic region; and providing, by the computing system, at least one content item that originated from the specified geographic region.

8. The computer-implemented method of claim 1, wherein the at least one set of content items includes one or more of: (i) content items that correspond to news events, (ii) content items that are trending at a threshold rate, or (iii) content items that correspond to trending topics.

9. A system comprising:

at least one processor; and a memory storing instructions that, when executed by the at least one processor, cause the system to perform:

providing a graphical user interface that includes a first region and a second region, wherein the first region in the interface provides access to at least one set of content items that are available for curation, wherein at least one content item in the set is obtained from a social networking system, wherein each content item in the set is associated with at least one option for exporting the content item, wherein the second region in the interface provides information for entities that are referenced in the at least one set of content items that are available for curation, and wherein the information at least describes a respective count of a number of times an entity was mentioned over a period of time by a plurality of authors each associated with demographics, wherein the demographics include at least one of age, gender, or geographic region and the respective count is segmented based on the demographics;

determining at least one first content item from the set that satisfies criteria for auto-curating content items, wherein the criteria for auto-curating content items includes search criteria for locating relevant content items; and exporting the first content item to a content provider for presentation, wherein the first content item is modified based at least in part on a specified theme corresponding to the content provider.

10. The system of claim 9, wherein the instructions, when executed by the at least one processor, further cause the system to perform:

receiving a request for information about a specified entity; and providing at least one content item that includes information describing a popularity of the entity.

11. The system of claim 10, wherein the information includes demographic information corresponding to authors of content items that mentioned the entity.

12. The system of claim 9, wherein the instructions, when executed by the at least one processor, further cause the system to perform:

receiving a request for information about a specified entity; and providing at least one second set of content items that includes content items that mention the entity, wherein at least one content item from the second set was posted through the social networking system.

13. A non-transitory computer-readable storage medium including instructions that, when executed by at least one processor of a computing system, cause the computing system to perform a method comprising:

providing a graphical user interface that includes a first region and a second region, wherein the first region in the interface provides access to at least one set of content items that are available for curation, wherein at least one content item in the set is obtained from a social networking system, wherein each content item in the set is associated with at least one option for exporting the content item, wherein the second region in the interface provides information for entities that are referenced in the at least one set of content items that are available for curation, and wherein the information at least describes a respective count of a number of times an entity was mentioned over a period of time by a plurality of authors each associated with demographics, wherein the demographics include at least one of age, gender, or geographic region and the respective count is segmented based on the demographics;

determining at least one first content item from the set that satisfies criteria for auto-curating content items, wherein the criteria for auto-curating content items includes search criteria for locating relevant content items; and exporting the first content item to a content provider for presentation, wherein the first content item is modified based at least in part on a specified theme corresponding to the content provider.

14. The non-transitory computer-readable storage medium of claim 13, wherein the instructions, when executed by the at least one processor of the computing system, cause the computing system to perform:
   receiving a request for information about a specified entity; and
   providing at least one content item that includes information describing a popularity of the entity.

15. The non-transitory computer-readable storage medium of claim 14, wherein the information includes demographic information corresponding to authors of content items that mentioned the entity.

16. The non-transitory computer-readable storage medium of claim 13, wherein the instructions, when executed by the at least one processor of the computing system, cause the computing system to perform:
   receiving a request for information about a specified entity; and
   providing at least one second set of content items that includes content items that mention the entity, wherein at least one content item from the second set was posted through the social networking system.

* * * * *